No. 768,845. PATENTED AUG. 30, 1904.
J. T. CROSSLEY.
TILING MACHINE.
APPLICATION FILED NOV. 19, 1903.
NO MODEL. 3 SHEETS—SHEET 1.
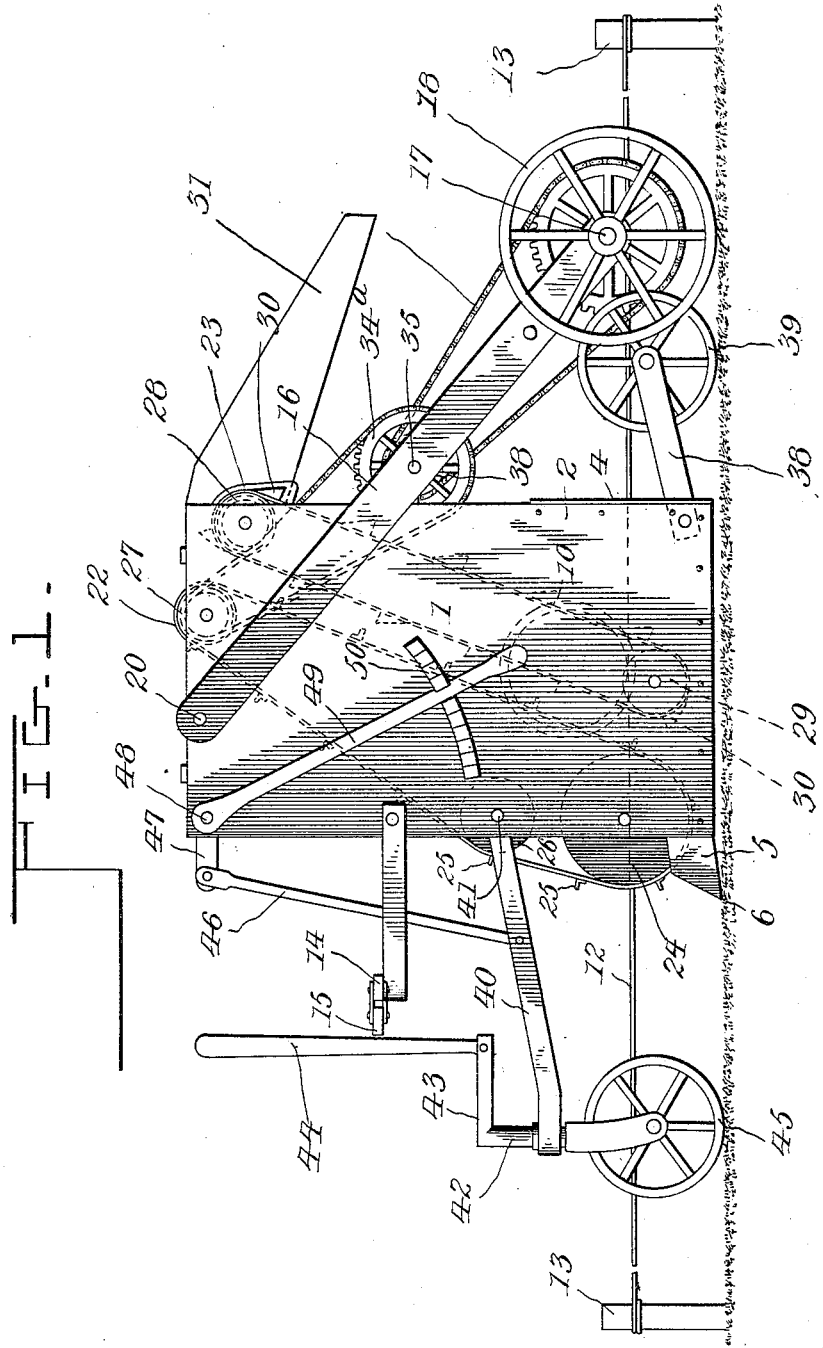
Witnesses:
John T. Crossley, Inventor
By Marion & Marion
Attorneys

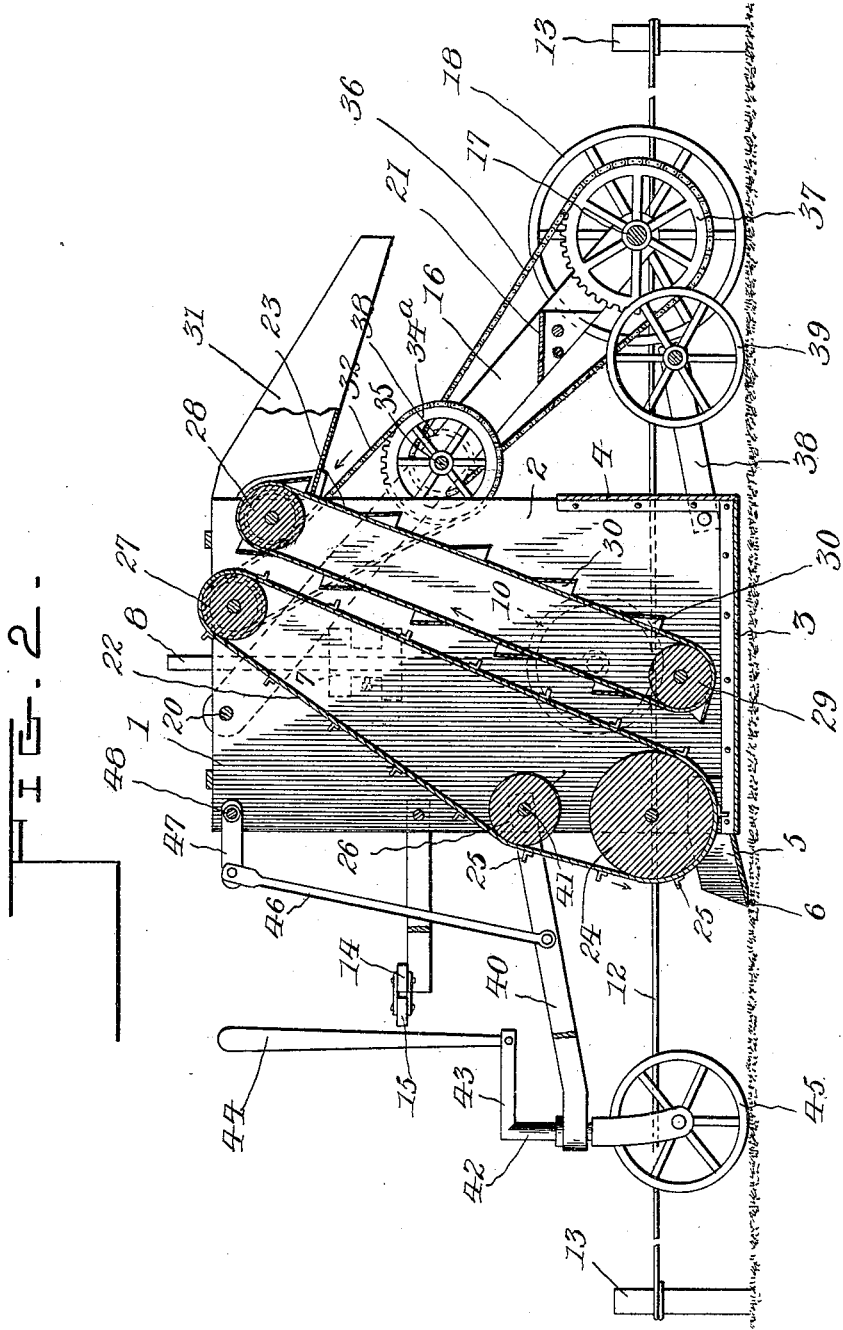

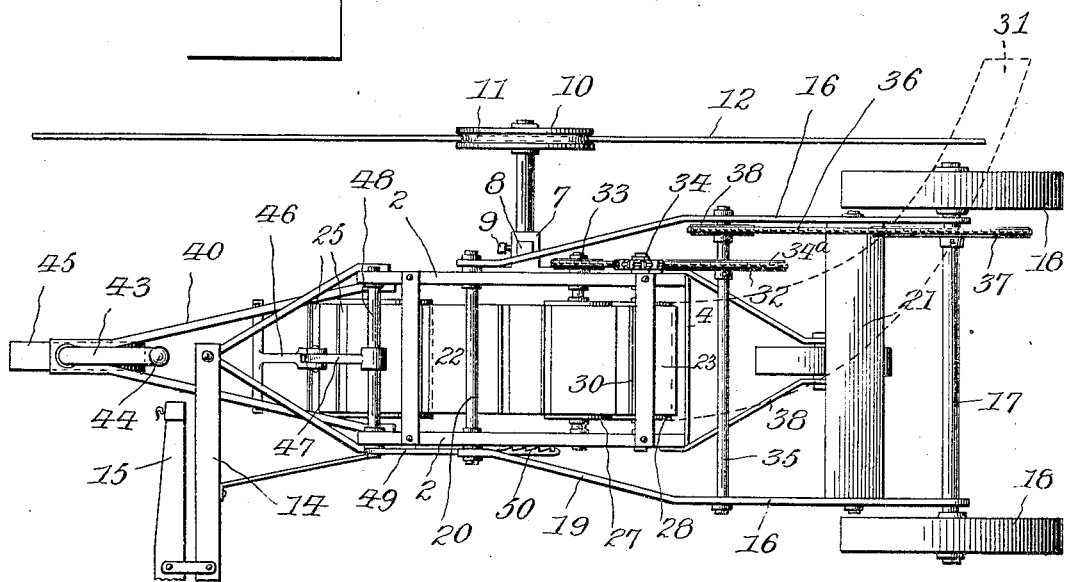
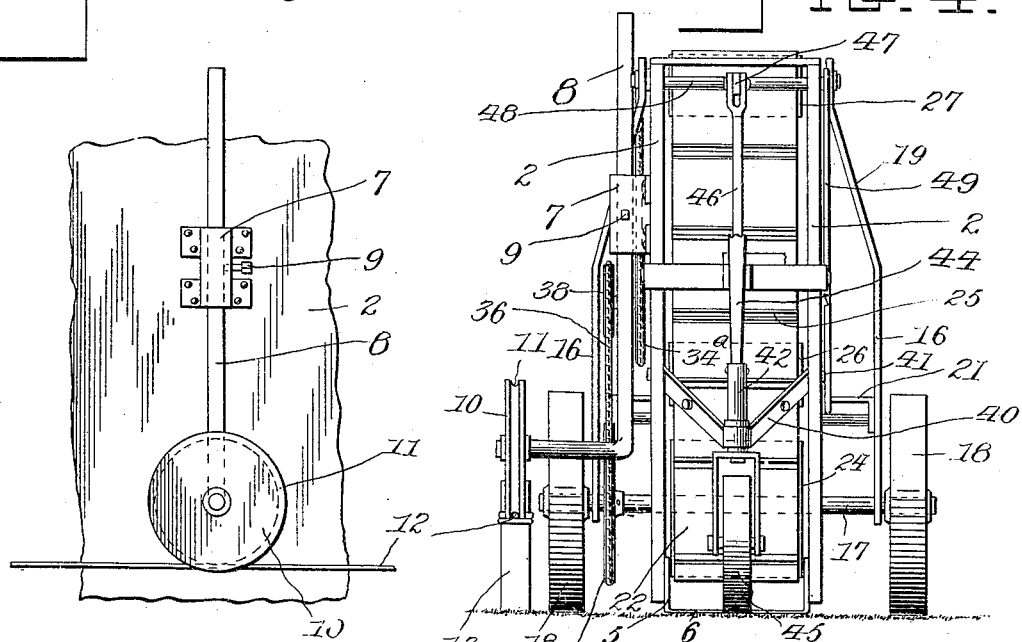

No. 768,845. Patented August 30, 1904.

UNITED STATES PATENT OFFICE.

JOHN T. CROSSLEY, OF BLYTHESWOOD, CANADA.

TILING-MACHINE.

SPECIFICATION forming part of Letters Patent No. 768,845, dated August 30, 1904.

Application filed November 19, 1903. Serial No. 181,892. (No model.)

*To all whom it may concern:*

Be it known that I, JOHN THEADOUS CROSSLEY, a subject of the King of Great Britain, residing at Blytheswood, county of Essex, in the Province of Ontario, Canada, have invented certain new and useful Improvements in Tiling-Machines; and I do hereby declare that the following is a full, clear, and exact description of the invention, such as will enable others skilled in the art to which it appertains to make and use the same.

My invention relates to the art of laying tiles; and the object of the invention is to produce an implement or machine especially adapted for the purpose of preparing ground for receiving tiles, bricks, or paving-stones.

In its general construction the invention comprises a body provided with a scoop or scraper at its forward portion adapted to excavate or scrape the surface of the earth, and in conjunction with this body arrangement is made for maintaining the same at such elevations as will render the same effective, so that the scoop will prepare the ground at the point where the tiles are to be laid, so that a substantially horizontal surface will be presented to receive the tiles. For effecting this end the invention contemplates the use of a tightly-drawn wire or cord which would be stretched across above the surface upon which the tiles are to be laid. This wire may be of any desired length and should be suitably fixed at its ends to posts which are to be driven into the ground, so that the machine may be guided thereby. Upon this wire a wheel would run, the said wheel supporting the said body referred to above and being adjustable with respect to the same vertically, whereby the depth of cut may be readily controlled. Generally the implement would be drawn along by a horse, and special arrangements would be made for moving the suspending-wire into successive positions across the surface to be prepared. By the use of this implement the operation of preparing the ground to receive the tiles would be very quickly effected.

The invention consists in the construction and combination of parts to be more fully described hereinafter and definitely set forth in the claims.

In the drawings, which fully illustrate my invention, Figure 1 is a side elevation of the same. Fig. 2 is a vertical sectional view of my invention. Fig. 3 is a plan, a chute which constitutes a portion of the invention being removed. Fig. 4 is a front elevation. Fig. 5 is a side elevation taken from the rear side, showing a portion of the device constituting the vertical adjustment.

Throughout the drawings and specification the same numerals of reference denote like parts.

Referring more particularly to the parts, 1 represents the body of the implement, which consists, as shown, of two oppositely-disposed plates 2, said plates being preferably of substantially rectangular form and disposed vertically a short distance apart. Between these plates 2 a bottom 3 is attached and a short back plate 4 therebehind. At the forward portion of the body a scoop or plow 5 is provided, the same having a substantially horizontal cutting edge 6, which is depressed with respect to the bottom 3, as shown. Upon the outer side of one of the side plates 2 there is attached a guide 7, in which there is mounted a wheel-post 8, the same being adjustably attached by means of a set-screw 9 and carrying at its lower extremity a wheel 10, which has a concave face 11, adapted to run upon a tightly-stretched wire 12, supported between suitable stakes 13, as shown. At the forward portion of the body and at a suitably-elevated point a draft-frame 14 is attached, to the forward portion of which a whiffletree 15 is connected, as shown, enabling the attachment of a horse for drawing the implement. Near the upper portion of the body oppositely-disposed bars 16 are attached, the same inclining downwardly and rearwardly and carrying at their lower extremities a transverse axle 17, carrying rigidly the wheels 18. As shown, the upper extremities of these bars 16 converge, as indicated at 19, so that their upper extremities lie adjacent to the side plates 2 and attach to a transverse arbor 20. Between the bars 16 a shelf or elongated platform 21 is mounted, upon which the operator of the implement may stand, if desired, in order to obtain sufficient traction at the wheels 18 to drive certain conveying mechanism within the body of the implement, which will be presently described.

The conveyers comprise two belts 22 and 23, which are continuously driven through the wheels 18 in order to effect the removal of material raised by the scoop 5. These belts are driven in opposite directions and are preferably arranged substantially as shown, the belt 22 passing around a pulley 24, which is disposed very close to the bottom 3 at the point of attachment of the scoop 5, and this belt is provided with transversely-disposed slats or pushers 25, which pass in a rearward direction just behind the scoop in order to advance the material excavated toward the belt 23. Just above the pulley 24 the belt 22 preferably passes over a guide-pulley 26, as indicated, and the upper extremity of this belt passes around a driving-pulley 27, as shown. This belt 22 is preferably disposed in a substantially inclined position, as indicated. Just at the rear of the belt 22 the belt 23 is located, the same being driven by a driving-pulley 28 and passing about a pulley 29 at its lower extremity, which latter pulley is disposed adjacent to the bottom 3, as indicated. This belt, like the belt 22, is continuously driven, and its face is provided with a plurality of buckets 30, which pass adjacent to the bottom in a forward direction, so as to receive the earth which is moved rearwardly by the belt 22, picking up the same and elevating it to the upper portion of the body, at which point it is delivered into an inclined chute 31, which carries the earth to one side. The belts 22 and 23 are driven through the medium of an auxiliary sprocket-chain 32, which passes, respectively, over and under sprocket-wheels 33 and 34, carried, respectively, by the spindles of the pulleys 27 and 28. From this arrangement evidently the pulleys 27 and 28 will drive their corresponding belts in opposite directions. The sprocket-chain 32 is driven by a sprocket-wheel 34ª, carried upon a transverse axle 35, supported in the side arms 16, as shown, which axle is itself driven by means of a main sprocket-chain 36, driven from the rear axle 17 by means of the sprocket-wheels 37 and 38.

Just behind the body there is attached a rear fork 38, at the rear extremity of which a trailer wheel 39 is attached, as shown, the function of which trailer wheel is to steady the rear portion of the body, as will be readily understood. To the forward portion of the body a forward yoke 40 is attached, the same being preferably pivotally attached upon the spindle 41 of the pulley 26 aforesaid. In the forward extremity of this fork a head 42 is rotatably mounted, the same having a substantially radial arm 43, to which a suitable handle 44 is attached, the said handle affording means for controlling the direction of the implement to a certain extent. The wheel 45, carried by the head 42, affords means for supporting a portion of the weight of the body. For this purpose a link 46 attaches to the said fork 40, the upper extremity of which link is connected with an arm 47, which arm is rigidly carried by a spindle 48, the said spindle having also a rigid lever 49 coöperating with a segment or quadrant 50, enabling the lever to be fixed in different positions, as will be readily understood.

In the operation of the device it should be understood that the wire 12, which may be of any predetermined length greater than the length of the apparatus for ditching, would be stretched between suitable stakes 13 or other supports, so that the wire could operate as a guide for the implement through the medium of the wheel 10. As the implement passes along the scoop 5 would scrape the surface to the required depth, which depth would be determined by the adjusting-bracket 7, as explained. Through the medium of the wheels 18 the belts 22 and 23 would be continuously driven in the directions indicated, so as to advance the excavated earth first toward the rear and then elevate the same, so as to deliver the excavated material into the chute 31.

The arm 47 being rigidly connected with the spindle 48 and said spindle having the lever 49 rigidly connected therewith and thereupon, it is evident that movement of the lever 49 along the ratcheted segment 50 will raise or lower the plates 2 2, digger 5, and belts 22 and 23, so that said members will be raised from or lowered to cut into the soil, according to the position of the lever 49 upon said segment 50. In the position shown in Fig. 1 the lever 49 and segment 50 support the digger 5, so as to just clear the ground. It is evident that segment 50 may be extended to provide greater or less vertical adjustment of the parts as may be desired and that the tightly-drawn wire 12 serves as a guide, when desired, to direct the machine along a predetermined line, though without such wire the machine will operate, if required so to do.

While I have shown in the accompanying drawings the preferred form of my invention, it will be understood that I do not limit myself to the precise form shown, for many of the details may be changed in form or position without affecting the operativeness or utility of my invention, and I therefore reserve the right to make all such modifications as are included within the scope of the following claims or of mechanical equivalents to the structures set forth.

Having described my invention, what I claim as new, and desire to secure by Letters Patent, is—

1. In an implement of the class described, in combination, a scoop, a tightly-drawn cable constituting a guide for said scoop, and means for adjusting the height of said scoop.

2. In an implement of the class described, in combination, a scoop, a tightly-drawn cable constituting a guide therefor, means for adjusting the height of said scoop with respect to said cable, and a conveyer for removing the material excavated by said scoop.

3. In an implement of the class described, in combination, a body, a scoop carried thereby, a tightly-drawn cable, a wheel running upon said cable, and means for adjustably connecting said wheel with said body.

4. In an implement of the class described, in combination, a body, a scoop carried thereby, a conveyer within said body adapted to elevate the material excavated by said scoop, a chute adapted to receive said material from said conveyer and adapted to deliver the same at one side, a cable constituting a guide for said body, and means whereby said body is guided by said cable.

5. In an implement of the class described, in combination, a body, a scoop carried thereby, a tightly-drawn cable constituting a guide for said body, means on said body coöperating with said cable, a conveyer carried by said body and adapted to remove the material excavated by said scoop, wheels carried at the rear of said body, and means for driving said conveyer from said wheels.

6. In an implement of the class described, in combination, a body, a scoop carried thereby, a cable constituting a guide for said body, means on said body coöperating with said cable, arms attached to said body and extending rearwardly therefrom, wheels carried by said arms, conveyers within said body, means for driving said conveyers from said wheels, and a chute adapted to receive material from said conveyers.

7. In an implement of the class described, in combination, a body having a bottom, a scoop carried forwardly of said bottom, a belt adapted to advance material along said bottom, a second belt adapted to elevate material from said bottom, wheels running upon the ground, means for driving said belts from said wheels, a chute adapted to receive material from said second belt, and a cable constituting a guide for said body.

8. In an implement of the class described, in combination, a body consisting of a pair of oppositely-disposed plates, a scoop attached to said plates at the forward edge thereof, a cable, a wheel running upon said cable, means for adjustably attaching said wheel to said body, a chute attached to the upper portion of said body, conveyers adapted to deliver excavated material to said chute, wheels running upon the ground, and means for driving said conveyers from said wheels.

9. In an implement of the class described, in combination, a body, a scoop carried at the forward portion thereof, arms pivotally attached to said body near the upper portion thereof and extending rearwardly and downwardly therefrom, wheels carried by the extremities of said arms, conveyers within said body, means for driving said conveyers from said wheels, a fork carried at the forward portion of said body, a guide-wheel carried by said fork, means for adjusting the height of said guide-wheel, a cable, and means for adjusting the height of said body with respect to said cable.

10. In an implement of the class described, in combination, a body, a scoop carried thereby, a conveyer-belt adapted to advance the material excavated by said scoop, a second conveyer-belt constituting an elevator and adapted to receive the material advanced by said first conveyer-belt, rear driving-wheels, means for driving said conveyer-belts from said wheels, a fork pivotally carried forwardly of said body, a guide-wheel carried by said fork, a lever adapted to maintain said fork in a plurality of positions, a wheel-post, means for adjustably attaching the same to said body, and a wheel carried by said wheel-post and adapted to run upon a cable.

In witness whereof I have hereunto set my hand in the presence of two witnesses.

JOHN T. CROSSLEY.

Witnesses:
WILLIAM IRWIN,
CARL G. GOWMAN.